Figure 1:
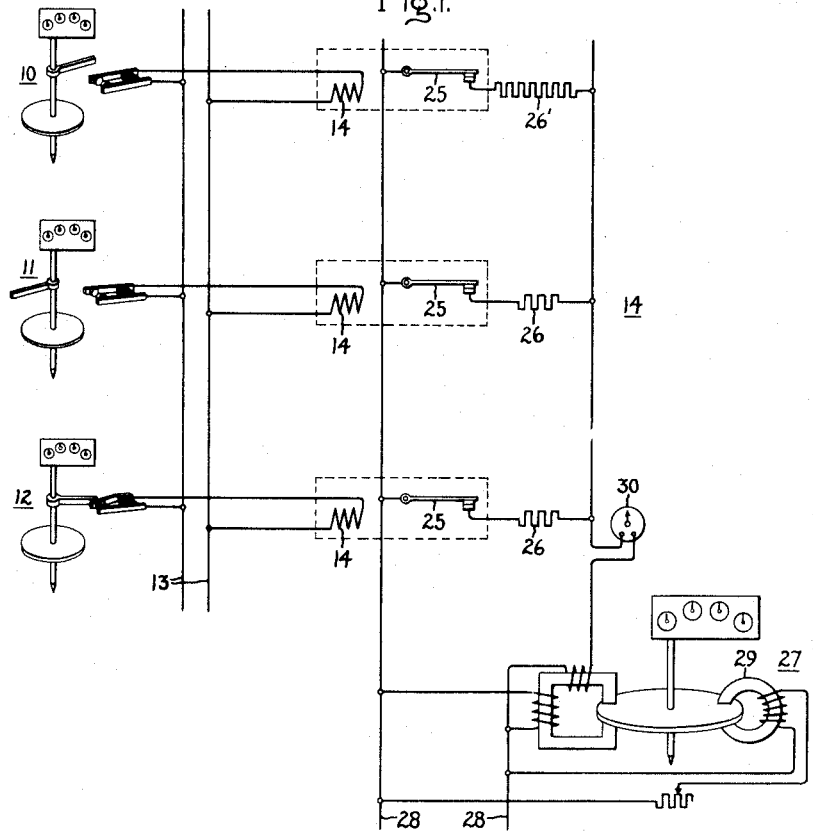

April 24, 1934.  H. H. CLAYTON  1,956,413

IMPULSE SUMMATION APPARATUS

Filed Jan. 13, 1933

Inventor:
Harold H. Clayton,
by Charles E. Tuller
His Attorney.

Patented Apr. 24, 1934

1,956,413

UNITED STATES PATENT OFFICE 1,956,413

IMPULSE SUMMATION APPARATUS

Harold H. Clayton, Fort Wayne, Ind., assignor to General Electric Company, a corporation of New York Application January 13, 1933, Serial No. 651,542

5 Claims. (Cl. 171—34)

My invention relates to a method of and apparatus for producing a totalizing measurement of a plurality of electric impulses where each impulse represents a definite measurement value. As an illustration of a practicable application of my invention, it may be assumed that it is desired to obtain a summation measurement of a plurality of integrating meters. These integrating meters are then provided with contact devices which transmit electric impulses at rates varying in proportion to the speeds of the integrating meters. According to my invention, I provide apparatus which produces an accurate summation measurement of any number of such individual impulse measurement circuits, regardless of variation in the length or current strength of individual impulses, and regardless of whether impulses of different circuits occur simultaneously or otherwise. According to my invention, each impulse is converted into or caused to produce a definite quantity of electricity proportional to the measurement value of the impulse in a common local circuit, and the sum total of the currents which are thus caused to flow in the local circuit is metered.

The features of my invention which are believed to be novel and patentable will be pointed out in the claims appended hereto. For a better understanding of my invention reference is made in the following description to the accompanying drawing showing in Fig. 1 a schematic view of the invention arranged to sum up a plurality of impulse metering circuits, and Fig. 2 represents a detail view of one of the devices used to convert impulses into definite quantities of electric energy.

Referring now to Fig. 1, 10, 11 and 12 represent integrating meters located at the same or widely different points, each integrating similar quantities, for example watt hours. Some of these meters may integrate direct current watt hours, while others may integrate alternating current watt hours, for example. Each meter is provided with an impulse transmitter in the form of a contact device which is momentarily closed for each rotation of the meter. The contact device for meter 12 is shown closed, and those of meters 10 and 11 are shown open. A suitable impulse current source, which may be either direct or alternating, is represented at 13. These meters will thus transmit impulses, each impulse representing that the corresponding meter has made a definite rotational measurement movement, as is well understood in the impulse telemetering art. These impulses are all transmitted to the summation station generally represented by 14, and are received by devices of the character represented in Fig. 2, there being one of these devices for each impulse circuit.

Figure 2:
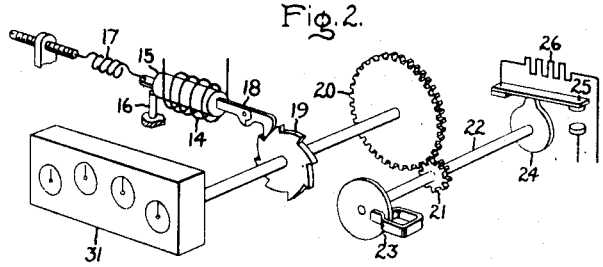

Before proceeding further with an explanation of Fig. 1, it will be best to explain the function and operation of the device of Fig. 2. The purpose of this device is to change an electric impulse, however feeble or strong, and whether of long or short duration, into a definite quantity of electricity, corresponding to the measurement value of the impulse. The impulse is received, after amplification if that be necessary, on the coil 14 of a ratchet relay which when deenergized has its magnetic plunger 15 pulled to the left against a stop 16 by a spring 17. The right-hand end of the plunger 15 is provided with a hinged pawl 18 made of non-magnetic material, which cooperates with the ratchet wheel 19. It is seen that when the coil 14 is energized by an impulse the pawl 18 is advanced over one tooth in the ratchet wheel against the pull of the spring 17, and as soon as the coil is deenergized the spring returns the plunger 15 and the pawl 18 to the position shown, turning the ratchet wheel one tooth's distance in a counter-clockwise direction. It is therefore evident that the turning effort of the ratchet wheel does not depend upon the strength or duration of the electric impulse, but only on the strength of spring 17, which is adjusted to a definite constant value. The ratchet wheel rotates a gear 20 and in turn a smaller gear 21 mounted on a shaft 22 such that shaft 22 preferably makes one complete revolution for each impulse operation. Shaft 22 is preferably provided with a magnetic damping device 23 and with a cam 24. Cam 24 closes and opens a contactor 25 for each rotation, coming to rest in the position shown with the contactor open. It is evident with the arrangement described that the shaft 22 will always make a revolution in the same duration of time following the reception of an impulse, and that, therefore, the contactor 25 will close for a definite interval following an impulse. If, now, the circuit including contactor 25 contains a definite amount of resistance or other noncapacitive impedance 26 and is energized by a constant source of voltage, the amount of electricity which will flow therein as the result of a reception of an impulse will be a definite amount and may be measured in any suitable way. The period of operation of the ratchet contact device must not be longer than the minimum time between impulses when received at the maximum rate. Thus, the device of Fig. 2 shows one way of providing definite quantities of electricity corresponding to the measurement values of received impulses even though the impulses vary in strength and duration. To illustrate an extreme case, let us suppose that the meter 12, Fig. 1, stops with its contactor closed so as to produce an impulse which is of several minutes' duration. Such an impulse produces the same operation of the receiving device as an impulse of a second duration.

Referring, now, to a further description of Fig. 1, it will be understood that the three impulse circuits shown will include apparatus at the receiving station 14 for receiving and interpreting impulses which is the same as or the equivalent of that shown in Fig. 2, but that only the coils 14 and contacts 25 are represented in Fig. 1, for the sake of simplicity. It will be evident that any number of such impulse circuits may be combined, and that additional impulse circuits may be added to the system from time to time without in any way interfering with the existing combination, except that it may eventually be necessary to provide a higher capacity totalizing meter when its load limit is reached. The totalizing meter is shown at 27, and if the source of supply 28 is a constant voltage source, meter 27 may be an ordinary ampere hour or watt hour meter. In this instance the meter 27 is represented as a watt hour meter provided with a damping magnet 29 energized from the source 28 to compensate the measurement for any variation in voltage that may occur in the source 28. The damping produced by magnet 29 will, of course, remain constant when the voltage of source 28 remains constant.

A heavily damped ammeter 30 may also be provided to give an indication of instantaneous value of the summation measurement. The ammeter 30 and the current coil of the meter 27 are connected so that the currents that flow in the resistances 26, 26 and 26' are combined and influence the meter so that summation measurements are obtained. It will be noted that resistance 26' is indicated as having a different value than the resistances 26. This is shown to illustrate the flexibility of the system. It is presumed here that impulses received from meter 10 have a different measurement value than those received from meters 11 and 12. For example, an impulse from meter 10 may represent one-half of the measurement value of an impulse from meter 11, due to the use of different capacity meters at 10 and 11, or to the use of different current transformer ratios in their energizing circuits, or for any other reason. This difference in the impulse measurement value can be taken care of readily by selecting a resistance at 26' that will pass one-half the current per impulse as compared to that which will pass through resistances 26. Exact adjustment of the amount of current which will pass upon the reception of an impulse may be obtained by slightly lengthening or shortening the duration of closure of the contactor 25 by adjustment of spring 17. Thus all impulses whether of the same or different measurement values are converted to a common measurement basis. It will furthermore be evident that the different contactors 25 may close simultaneously or at different instances without changing the summation measurement result. Each individual impulse receiving device may also be metered at the receiving station, if desired, by having the individual impulse receiving devices drive a register as indicated at 31 in Fig. 2.

It will be evident to those skilled in the art that the apparatus used to carry out the invention may be modified. Such modifications as do not depart from the true spirit and scope of the invention disclosed are intended to be included within the scope of the appended claims.

What I claim as new and desire to secure by Letters Patent of the United States, is:—

1. An impulse summation system comprising a plurality of impulse metering circuits, a local electric circuit including an electric meter, a source of supply and a plurality of branches each including a noncapacitive impedance device and a contactor, the arrangement being such that currents flowing through the branch circuits when the contactors are closed all flow through said meter, a plurality of impulse receiving devices, there being an impulse receiving device associated with each impulse circuit and each of said contactors, and each impulse receiving device including means for closing the contactor with which it is associated a definite length of time for each impulse received, such that the currents which are caused to flow in the local circuit represent the measurement values of the received impulse on a common measurement basis.

2. An impulse summation system comprising a plurality of circuits in which impulses are produced in response to metered quantities, an impulse receiving and interpreting device associated with each of said impulse circuits, a local alternating current electric circuit containing parallel branches associated with the different impulse receiving and interpreting devices, said last mentioned devices serving to cause the flow of alternating currents in the corresponding branch circuits, which currents are representative in quantity of the measurement value of the received impulses on the same measurement basis, and an alternating current metering device for measuring the sum of the currents flowing in all of said branch circuits.

3. An impulse summation system comprising a plurality of impulse metering circuits, a local electric circuit including a plurality of parallel branches, a resistance and a contactor in each branch, impulse receiving devices in the different impulse circuits associated with the different contactors, each impulse receiving device including means for closing the associated contactor for a definite adjustable length of time upon the reception of an impulse, the value of the resistance and duration of contact closure being such that the quantity of current which is caused to flow in the corresponding branch circuit is representative of the measurement value of the received impulses, the measurement value of the currents flowing in different branch circuits being on the same measurement basis, and an electric meter for measuring the total of the currents flowing in the different branch circuits in terms of the summation value of all of the impulses of the different impulse circuits.

4. An impulse summation system comprising a plurality of impulse metering circuits, a local electric circuit containing a corresponding number of parallel branches each including a noncapacitive impedance and a contactor, impulse receiving devices in the different impulse circuits for controlling the closing and opening of the different contactors so that currents representative in quantity to the measurement value of received impulses are caused to flow in the corresponding branch circuits, and an electric meter for measuring the total current in the branch circuits.

5. In an impulse metering system, an impulse metering circuit, an impulse receiving device therein comprising a ratchet relay having a spring retracted pawl which is advanced upon the reception of an impulse, a ratchet wheel operated by said pawl when retracted by the spring, a magnetically damped shaft rotated one revolution by said ratchet wheel for each operation of the pawl thereon, a normally open contactor which is momentarily closed by the rotation of said shaft, an electric circuit in which said contactor is contained, means in said circuit for causing a current having a value corresponding to the measurement value of the impulse to flow in said circuit when said contactor is closed, and means for measuring said current.

HAROLD H. CLAYTON.